Figure 6:
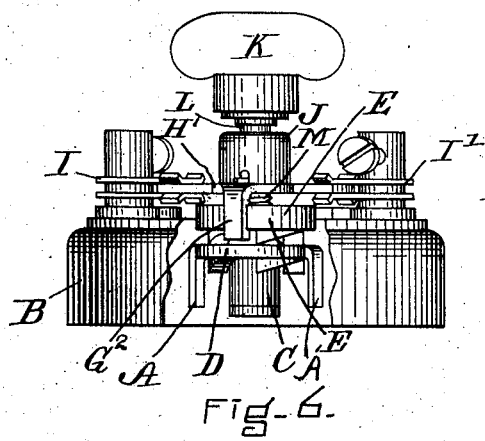

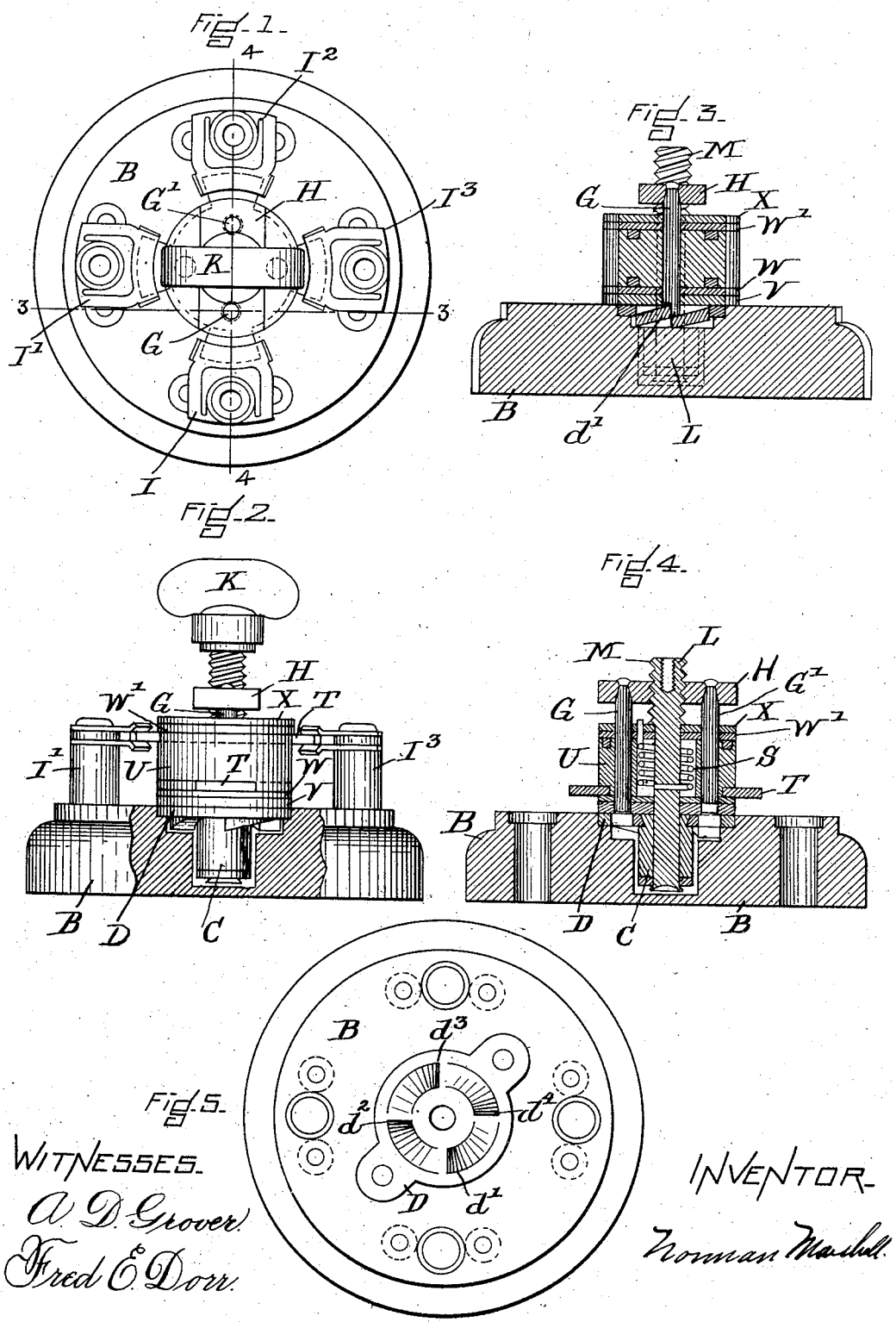

No. 768,474. PATENTED AUG. 23, 1904.
N. MARSHALL.
ELECTRIC SNAP SWITCH.
APPLICATION FILED DEC. 24, 1900.
NO MODEL. 2 SHEETS—SHEET 2.

WITNESSES.
A. D. Grover
Fred E. Dorr

INVENTOR.
Norman Marshall

No. 768,474.

Patented August 23, 1904.

UNITED STATES PATENT OFFICE.

NORMAN MARSHALL, OF NEWTON, MASSACHUSETTS, ASSIGNOR TO MARSHALL-SANDERS COMPANY, OF BOSTON, MASSACHUSETTS, A CORPORATION OF MAINE.

ELECTRIC SNAP-SWITCH.

SPECIFICATION forming part of Letters Patent No. 768,474, dated August 23, 1904.

Application filed December 24, 1900. Serial No. 41,009. (No model.)

*To all whom it may concern:*

Be it known that I, NORMAN MARSHALL, a citizen of the United States, residing at Newton, county of Middlesex, State of Massachusetts, have invented a new and useful Electric Snap-Switch, of which the following is a specification.

My invention relates to electric switches, and more especially to snap-switches in which the movement of the movable contact is controlled by a plate provided with one or more stops coöperating with one or more catches connected with the movable contact.

Certain features of the invention relate to stop-plates embodied in this class of switches, and the object is to provide a simple and efficient stop-plate which may be conveniently and cheaply manufactured and is well adapted to production by automatic machinery, whereby the construction of the switch is simplified and the cost of production reduced. To these ends I construct the stop-plate from sheet metal and form the stops thereon by shearing through the metal and bending the sheared portion or portions out of the plane of the body of the plate, thus forming a stop-shoulder either at the end of the bent portion or at the end of the recess formed in the plate by the offsetting or bending of the sheared portion. The part of the plate thus offset or bent out of the plane of the plate forms a cam-surface on the plate for preventing backward movement of the operating mechanism, as will be more fully explained hereinafter. A stop-plate of this character may be more cheaply manufactured than stop-plates in which the stop-shoulders or cam-surfaces are formed by milling or otherwise cutting away the metal, both on account of the reduction in the waste of the stock and also on account of the convenience and rapidity with which the plates may be produced, especially where automatic machinery is employed in shearing and bending the sheet metal and the expense of producing the switches in which the plates are incorporated is consequently reduced. The plates may be cut from sheet metal and the plates sheared through an offset or bent by the action of punches having helical surfaces corresponding in number to the number of stop-shoulders and cam-surfaces to be formed. The catch or catches which coöperate with the stop or stops on the stop-plate may be and preferably are formed by shearing through a plate of sheet metal and offsetting or bending the sheared portion out of the plane of the plate, the end of the sheared and bent portion or the end of the recess thus formed in the plate acting as a catch to engage the stop or stops on the stop-plate. By thus forming the catch-plate and stop-plate a simple and inexpensive construction is provided for controlling forward movement of the movable contact and locking said contact against backward movement.

In explaining the invention more fully I will refer to the following drawings, in which—

Figure 9:
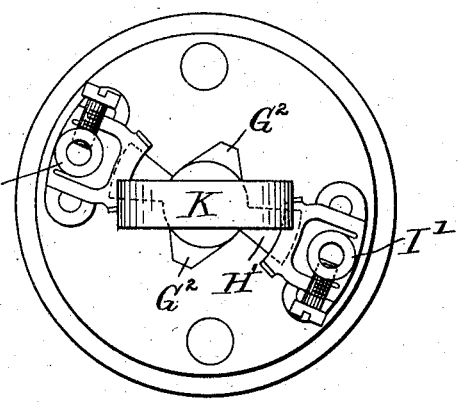
Figure 7:
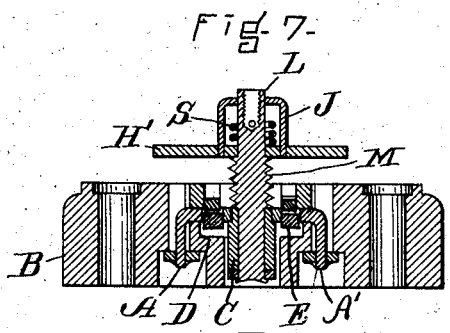
Figure 10:
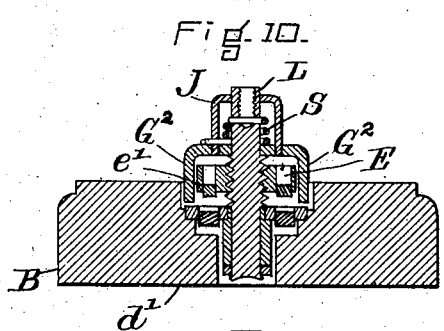
Figure 8:
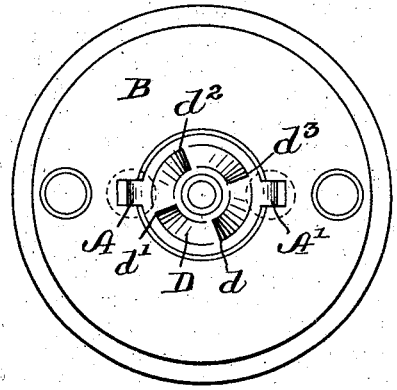
Figure 11:
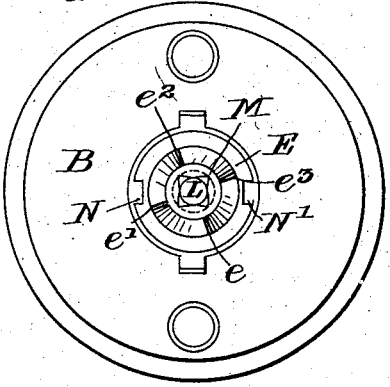

Figure 1 is a plan view of a double-pole switch embodying certain features of the invention in the preferred form. Fig. 2 is an elevation of the same, partly in section. Fig. 3 is a sectional view on line 3 3 of Fig. 1. Fig. 4 is a sectional view on line 4 4 of Fig. 1. Fig. 5 is a plan view of the base and cam stop-plate with the other parts removed. Fig. 6 is an elevation of a single-pole switch embodying the features of the invention in their preferred forms, parts of the base being broken away. Fig. 7 is a vertical sectional view through the center of said switch, the parts being in the locked position and the binding-posts and stationary contacts removed. Fig. 8 is a plan view of the base and cam stop-plate with the other parts removed. Fig. 9 is a plan view of the complete switch. Fig. 10 is a sectional view showing the parts in the moving position. Fig. 11 is a plan view with the parts above the catch-plate removed.

In the switch shown in Figs. 1 to 5 the parts are supported on an insulating-base B. The binding-posts I I' I² I³ are secured to the base B and support the fixed contacts, which in the form shown consist of blades forming brushes arranged to engage opposite sides of the movable contacts or connector-bars T.

These bars are carried by an insulating-disk U, mounted on the operating-spindle L and connected with said spindle by a torsional spring S. The bars T are held in recesses in the ends of the disk U by disks X and V, from which they are separated by insulating-disks W W'. When the spindle L is turned by means of the handle K, secured to the upper end, the disk U is held from rotation by a stop or stops coöperating with a catch or catches connected with said disk, and the spring S is wound up or its tension increased until the catches and stops are disengaged, when the spring acts to suddenly and quickly advance the disk U and the contacts carried thereby until the advance of the disk is arrested, thereby suddenly engaging or disengaging the movable and stationary contacts. The stop or stops for preventing and arresting the advance movement of the disk U are formed on a metal plate D, secured to the base B. This plate is constructed of sheet metal, and the stops, of which there are four in the switch shown, are formed by offsetting or bending downward portions of the plate to form gradually-deepening recesses, which terminate in shoulders or stops where the metal is sheared through, as at $d'$ $d^2$ $d^3$ $d^4$. The surface of the portions of the plate which are thus bent or forced out of the plane of the plate form cam-surfaces the purpose of which will be explained hereinafter. Instead of forcing or bending portions of the plate downward portions may be offset or bent upward, in which case the end of the portion which is sheared through and projects above the body of the plate will form a stop and the inclined surface of the portion which is offset will form a cam-surface. The spindle L is mounted to turn in a sleeve or bearing C, secured to the plate D, and the plate is secured to the base by screws passing through holes formed in ears on the plate which project into radial recesses extending from the central recess in the base in which the plate D is located. The catches which coöperate with the stops on the stop-plate consist of two pins G G', extending through holes in the disk U and having their lower ends arranged to engage the stop-shoulders on the plate D. The engagement and disengagement of the catches with the stop-shoulders is controlled by a screw-thread M, formed on the spindle L and engaging a screw-thread formed in a yoke or bar H, to which the pins G G' are secured. When the parts are at rest, the catches engage two of the stops—as, for instance $d'$ and $d^3$, Fig. 3. With the parts in this position any backward movement of the pins G G', unless accompanied by a longitudinal movement of said pins, is prevented by the cam-surfaces in the rear of the shoulders $d'$ $d^3$, and since longitudinal movement of said pins is prevented by the screw M any attempt to turn the spindle backward tends to turn the spindle with relation to the yoke H, thus through the action of the screw crowding the pins more firmly down against the cam-surfaces. The cam-surfaces act therefore to prevent any backward movement of the spindle or contacts. If the spindle is turned forward, the disk U is held from forward movement by the catches and stops, so that the spindle turns with relation to the disk U and yoke H, and the screw acts to raise the pins G G' until the ends are above the catch-shoulders. During this movement of the spindle the tension of the spring S is increased, and when the catches are disengaged from the stops the disk U is suddenly advanced by said spring. When thus advanced, the movement of the disk is more rapid than the movement of the spindle, and in the forward movement of the yoke H about the spindle the screw moves the yoke and pins G G' downward, so that the ends of the pins bring up against the succeeding stops $d^2$ $d^4$ and arrest the forward movement of the disk U and contacts T. On the next forward turning of the spindle the operations are repeated.

Instead of forming a plurality of stops on the stop-plate a single stop and cam-surface may be employed if desired, in which case four catches should be connected with the movable contacts in case the contacts are to make a fourth of a revolution at each operation or the number of catches may be varied. In case fixed contacts are employed which do not require the movable contacts to remain in the same plane, but permit the moving contacts to travel vertically, the catches may be rigidly connected with the contacts, so that the contacts will partake of the vertical movement of the catches.

In Figs. 6 to 11 I have shown a form of single-pole switch in which a cam stop-plate is employed embodying the features of invention referred to and in which the catches are constructed in accordance with certain other features of invention. In this switch the binding-posts I I' and the stationary contacts are similar to those in the double-pole switch described, and the movable connector or contact-bar H' is mounted upon the spindle L to remain in the same plane. The stop-plate is of the same construction already described, with the exception that in this switch the radially-extending ears A A' are bent downward from the plate and extending through holes in the base, the lower ends of the ears being engaged by disks or nuts, which bind the plate to the base. The catches, which coöperate with the stop-shoulders on the plate D, are formed by offsetting or bending downward portions of a catch-plate E, the ends of the portions which are sheared through forming catches, as at $e$ $e'$ $e^2$ $e^3$, the number of catches in the form shown corresponding to the number of stop-shoulders on the stop-plate. The catch-plate may, however, be provided with a single catch, if desired, or the stop-plate may have a single stop-shoulder to be successively engaged by the catches on the catch-plate. The catch-plate is screw-threaded at its center to engage the screw-thread M on the spindle, and the catch-plate is connected with the contact-bar H' by means of arms $G^2$, which project downward from the bar and extend through recesses N N' in the edge of the catch-plate, Figs. 10 and 11. The contact-bar is provided with a dome J to lengthen its bearing on the spindle and is connected with the spindle by a torsional spring S. The general operation of this switch is substantially the same as the operation already described, the stop-shoulders and cam-surfaces on the stop-plate coöperating with the catches on the catch-plate to prevent backward movement of the parts of the switch and to hold the contact-bar from forward movement until the catch-plate has been lifted by the screw on the spindle to disengage the catches and stops, when the spring snaps the contact-bar forward, bringing the catches into engagement with the succeeding stops.

What I claim, and desire to secure by Letters Patent, is—

1. A snap-switch comprising an insulating-base provided with a central recess, radial recesses extending therefrom, a metal plate mounted in said central recess having portions thereof offset or bent out of the plane of the plate to form stop-shoulders and cam-surfaces and having ears projecting into said radial recesses, a catch for coöperating with said stop-shoulders and cam-surfaces, an operating-spindle provided with a screw-thread for moving the catch axially, and a spring connecting said catch and spindle, substantially as described.

2. In a snap-switch the combination of an insulating-base, a stop-plate provided with stop-shoulders, a catch-plate provided with catches for engaging said stop-shoulders, an operating-spindle provided with a screw-thread engaging a screw-thread in said catch-plate, a contact-bar mounted on said spindle above said catch-plate and provided with downwardly-bent portions $G^2$ forming arms, grooves in the periphery of the catch-plate through which said arms pass, and a spring connecting said bar and spindle.

NORMAN MARSHALL.

Witnesses:
 E. M. BAKER,
 L. G. MILTON.